United States Patent [19]
Thistle et al.

[11] Patent Number: 5,642,753
[45] Date of Patent: Jul. 1, 1997

[54] VALVE UNLOADER ASSEMBLY

[75] Inventors: Ethan P. Thistle, Corning; Michael A. DeCerbo, Painted Post, both of N.Y.; John R. Metcalf, Houston, Tex.

[73] Assignee: Dresser-Rand Company, Corning, N.Y.

[21] Appl. No.: 674,058

[22] Filed: Jul. 1, 1996

[51] Int. Cl.$^6$ ............................................. F16K 15/00
[52] U.S. Cl. .................... 137/512.1; 137/522; 417/446; 417/297; 417/298
[58] Field of Search ..................... 137/522, 523, 137/516.11, 516.13, 516.15, 512.1; 417/446, 297, 298

[56] References Cited

U.S. PATENT DOCUMENTS

| | | | |
|---|---|---|---|
| 2,907,344 | 10/1959 | Sochting et al. | 137/522 |
| 2,957,620 | 10/1960 | Turnwald | 417/446 |
| 3,042,289 | 7/1962 | Mikina | 137/522 |
| 3,294,314 | 12/1966 | Ott et al. | 417/446 |
| 4,632,145 | 12/1986 | Machu | 137/516.21 |
| 4,799,507 | 1/1989 | Hrabal | 137/516.21 |
| 4,869,291 | 9/1989 | Hrabal | 137/516.21 |
| 5,025,830 | 6/1991 | Kursar | 137/522 |
| 5,378,117 | 1/1995 | Bennitt | 137/522 |

FOREIGN PATENT DOCUMENTS 1065630  1/1984  U.S.S.R. ..................... 137/516.15

*Primary Examiner*—Denise L. Ferensic
*Assistant Examiner*—Joanne Y. Kim
*Attorney, Agent, or Firm*—Bernard J. Murphy

[57] ABSTRACT

A plate mounted to a reciprocable shaft has a plurality of straight fingers (a) coupled thereto and (b) extending perpendicularly therefrom, and each of the fingers is separately detachable from the plate to simplify and facilitate maintenance and repair. Further, the fingers are identical, whereby manufacturing and stocking requirements are minimized.

13 Claims, 2 Drawing Sheets

VALVE UNLOADER ASSEMBLY

This invention pertains to valve unloader mechanisms, the same comprising those mechanical means which hold valves, in gas compressors and the like, in an open condition, when it is desired to operate the compressor unloaded, and in particular to a novel valve unloader assembly which requires no expensive casting or other costly fabrication, and an assembly which accommodates facile maintenance and repair thereof.

Valve unloader assemblies are well known in the prior art, representative embodiments thereof being disclosed in U.K. patent No. 845,076, of Dec. 29, 1958, granted to Luisesupe-Dienes, for "Improvements in Piston Compressor of Pump Head and Valve Assembly", U.S. Pat. No. 2,155,257, issued to Philip L. Crittenden, on Apr. 18, 1939, for a "Fluid Compressor", U.S. Pat. No. 4,869,289, issued on Sep. 26, 1989, to Hans Hrabal, for "Adjustable Compressor Valve which can Accommodate Changing Operating Conditions in the Compressor to which it is Attached", and U.S. Pat. No. 5,025,830, issued on Jun. 25, 1991, to James V. Kursar, for "Valve Unloader Finger Assembly, a Method of forming the Same, a Kit, and a Plate Therefor".

Each of the aforesaid patents present valve unloader mechanisms which are commendable and efficient. Particularly, the disclosure in U.S. Pat. No. 5,025,830 offers a valve unloader finger assembly which is singularly inexpensive of manufacture and easy to assemble and disassemble. However, in none of the aforesaid patents is there set forth an assembly which will accommodate the removal and replacement of individual fingers of the assembly. In each of the aforecited patents, the subject mechanisms require substantial disassembly thereof to facilitate finger replacement, and in most of the patented disclosures, the individual fingers are not identical and, therefor, interchangeable.

It is an object of this invention to set forth a novel valve unloader assembly in which removal and replacement of the individual fingers can be performed, and an assembly in which the individual fingers are identical and interchangeable, whereby maintenance and repair is made simple, and the standardization of the fingers thereof provides for reduced manufacturing and minimal parts stocking.

Particularly it is an object of this invention to set forth a valve unloader assembly comprising a plate; and a plurality of fingers (a) coupled to, and (b) extending perpendicularly from said plate; wherein each finger, of said plurality thereof, is separately detachable from said plate.

Further objects of this invention, as well as the novel features thereof, will become apparent by reference to the following description, taken in conjunction with the accompanying figures, in which.

Figure 1:
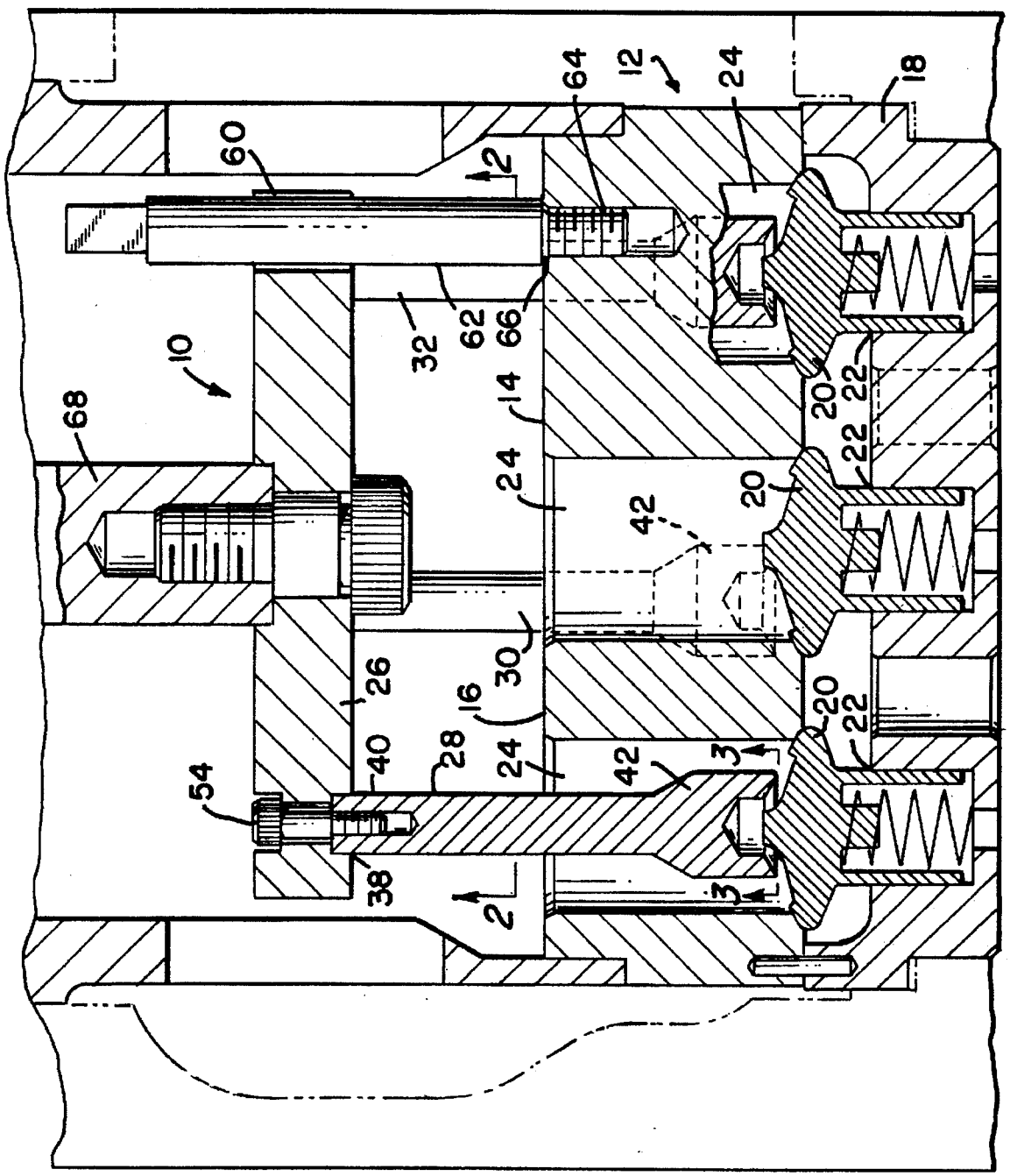
FIG. 1 is a vertical, cross-sectional view of a compressor valving unit in which an embodiment of the invention is incorporated.
Figure 2:
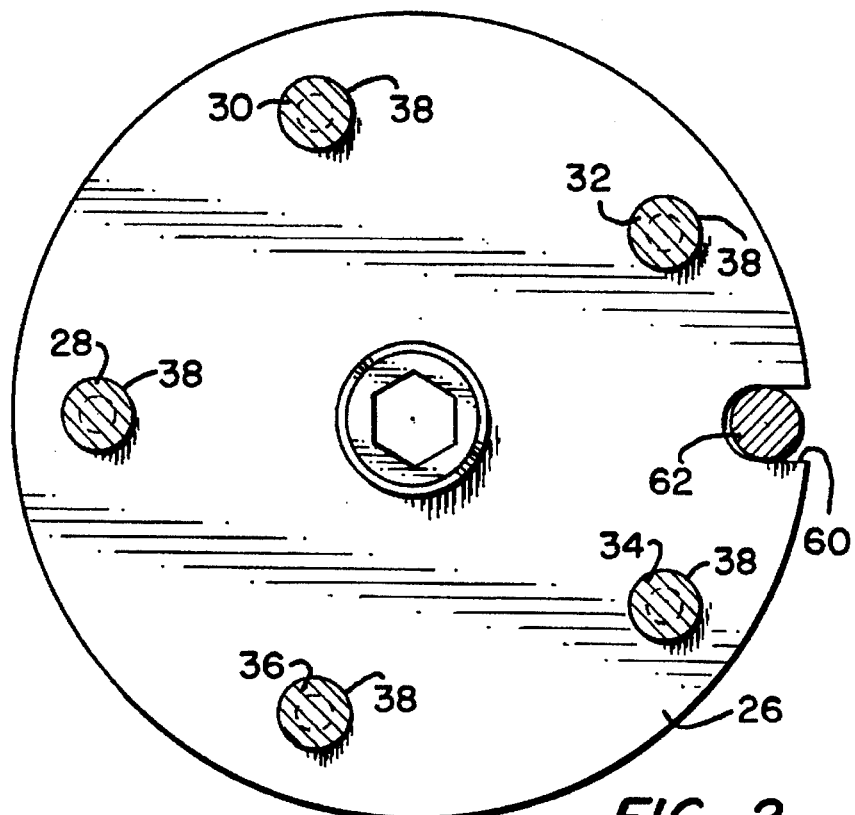
FIG. 2 is a cross-sectional view taken along section 2—2 of FIG. 1.

As shown in FIGS. 1 and 2, the novel valve unloader assembly 10 is incorporated in a compressor valving unit 12 in which a valving assembly 14 comprises a ported valve seat 16 joined to a similarly ported valve stop plate 18. Spring-loaded, poppet-type valving elements 20 are biasingly displaceable in bores 22 provided therefor in the seat 16. The elements 20 are displaceable, as said, from and toward fluid ports 24 formed in the seat 16, to permit fluid flow, and to shut off fluid flow, through the ports 24.

Figure 4:
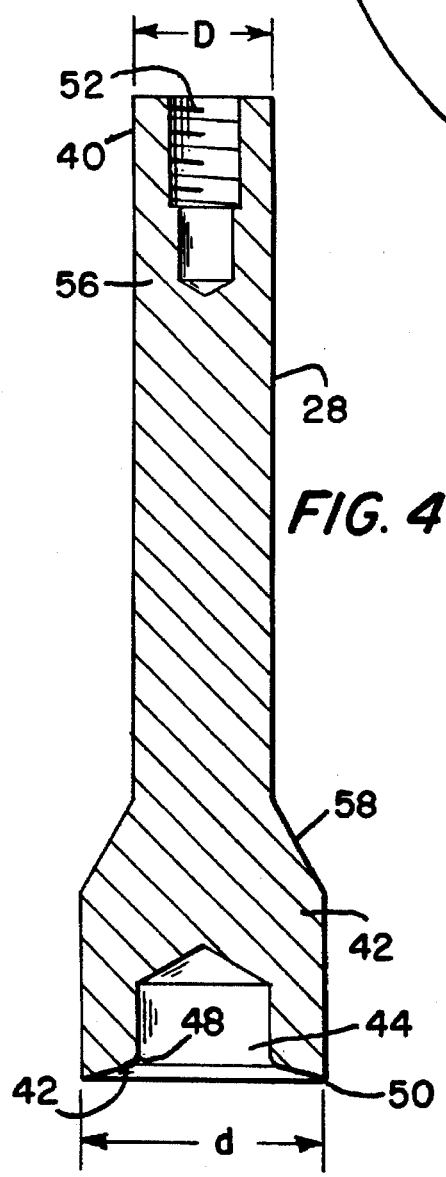
FIG. 4 is an axially depicted cross-section of one of the fingers of the assembly of FIG. 1, the same being in enlarged scale as compared to the scale of FIGS. 1 through 3.
Figure 3:
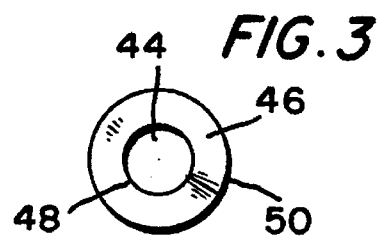
FIG. 3 is a bottom view of one of the novel fingers of the subject valve unloader assembly, taken along 3—3 of FIG. 1.

As is conventional, the valve unloader assembly 10 is provided to move the valving elements 20 away from the seat 16, by way of unloading the compressor of the unit 12. Assembly 10 comprises a circular plate 26 which has a plurality of fingers 28, 30, 32, 34 and 36 coupled to, and extending perpendicularly from the plate 26. The plate 26 has a same plurality of mounting holes 38 formed therethrough in which, replaceably, to receive the fingers 28, 30, 32, 34 and 36. Each of the fingers, finger 28 being representative, is identical to the others thereof, and has a first, mounting end 40 and a second, working or valve-engaging end 42. End 42, as can be seen in FIGS. 3 and 4, has a center relief 44 which defines an annular, inclined rim 46. Rim 46 has inner and outer edges 48 and 50, respectively, and edge 48 is radiused. Rim 46 is inclined, and edge 48 is radiused, to conform to the configuration of the interfacing surface of the valving elements 20. This matching of the geometries of the valving elements surfaces and the working ends 42 of the fingers, reduces impacting or contacting stress of the elements 20.

End 40 has a tapped hole 52 threadedly to receive a machine screw 54 which is in penetration of a hole 38 for fastening of end 40 to the plate 26. Consequently, each of the fingers 28, 30, 32, 34 and 36 is individually removable from the plate 26, when replacement is necessary. Too, in that the fingers are identical, it is necessary only to stock the one, same finger configuration for maintenance and servicing of the assembly 10. As can be seen, each finger, throughout a major length or portion 56 thereof comprises a rod of uniform diameter "D" whereas the second, working end 42 is enlarged, to provide for the relief 44 and rim 46, having a greater diameter "d". Between diameters "D" and "d", the finger 38 has an intermediate portion 58 of substantially uniformly tapering configuration which integrates the two diameters "D" and "d".

Plate 26 has a slot 60 formed in the periphery thereof, and an alignment stud 62 is in traverse thereof. Stud 62 has a threaded end 64 which is fastened in a tapped bore 66 provided therefor in the valve seat 16. Stud 62 is provided to insure against any inadvertent rotation of the plate 26, ascertaining that alignment between the fingers 28, 30, 32, 34 and 36 and the valving elements 20 is maintained.

Conventionally, the plate 26 is bolted to a reciprocable plunger-type shaft 68 by means of which the plate 26 and its fingers 28, 30, 32, 34 and 36 are translated.

While we have described our invention in connection with a specific embodiment thereof, it is to be clearly understood that this is done only by way of example, and not as a limitation to the scope of the invention as set forth in the objects thereof, and in the appended claims. The fingers 28, 30, 32, 34 and 36 are shown bolted to the plate 26 by means of machine screws 54 (only one of which is shown). Self-evidently, and alternatively, the fingers could have threaded ends 40 in penetration of the plate 26 to receive nuts thereupon, or the ends 40 could be threaded to engage like-threaded mounting holes in the plate 26. These and all other alternative embodiments of the invention which will occur to others, by taking teaching from our disclosure, are deemed to be within the ambit of our invention, and embraced by the appended claims.

We claim:

1. A valve unloader assembly, comprising:

a plate; and a plurality of fingers (a) coupled to, and (b) extending perpendicularly from said plate; wherein
 each finger, of said plurality thereof, is separately detachable from said plate;
 said fingers, of said plurality thereof, have first, mounting ends, and second, valve-engaging ends;
 said first ends have means for fastening mounting hardware thereto; and
 each finger, at said second end thereof, has a center relief formed therein.

2. A valve unloader assembly, according to claim 1, wherein:

said plate has a plurality of holes formed therein; and each finger, of said plurality thereof, is engaged with a given one of said holes.

3. A valve unloader assembly, according to claim 1, wherein:

said fingers, of said plurality thereof, have first, mounting ends, and second, valve-engaging ends; and said first ends have means for fastening mounting hardware thereto.

4. A valve unloader assembly, according to claim 1, wherein:

said plate has means formed therein for guidingly receiving an alignment element.

5. A valve unloader assembly, according to claim 4, wherein:

said plate is substantially circular; and said receiving means comprises means, formed in the periphery of said plate, for traverse thereof by an alignment element.

6. A valve unloader assembly, according to claim 4, wherein:

said plate has a periphery; and said receiving means comprises a slot formed in said periphery.

7. A valve unloader assembly, according to claim 1, wherein:

each finger, throughout a major portion of the length thereof, comprises a rod of uniform diameter, and at said second, valve-engaging end thereof has a diameter which is greater than said uniform diameter.

8. A valve unloader assembly, according to claim 7, wherein:

each finger has an intermediate portion, between said major portion thereof and said second, valve-engaging end thereof, which is of substantially uniformly tapering configuration, and which integrates said uniform and said greater diameters.

9. A valve unloader assembly, according to claim 1, wherein:

said fingers of said plurality thereof are identical.

10. A valve unloader assembly, comprising:

a plate; and a plurality of fingers (a) coupled to, and (b) extending perpendicularly from said plate; wherein
 each finger, of said plurality thereof, is separately detachable from said plate;
 said fingers, of said plurality thereof, have first, mounting ends, and second, valve-engaging ends;
 said first ends have means for fastening mounting hardware thereto; and
 said fastening means comprises tapped bores formed in said second ends.

11. A valve unloader assembly, comprising:

a plate; and, a plurality of fingers (a) coupled to, and (b) extending perpendicularly from said plate; wherein
 each finger, of said plurality thereof, is separably detachable from said plate;
 said fingers, of said plurality thereof, have first, mounting ends, and second, valve-engaging ends;
 said first ends have means for fastening mounting hardware thereto; and
 each finger, at said second end thereof, has an annular, inclined rim.

12. A valve unloader assembly, according to claim 11, wherein:

said rim, of each finger, has inner and outer edges; and said inner edge is radiused.

13. A valve unloader assembly, according to claim 11, wherein:

said rim, of each finger, has inner and outer edges; and one of said edges is radiused.

* * * * *